United States Patent
Kang et al.

(10) Patent No.: US 9,509,947 B2
(45) Date of Patent: Nov. 29, 2016

(54) METHOD AND APPARATUS FOR TRANSMITTING FILE DURING VIDEO CALL IN ELECTRONIC DEVICE

(71) Applicant: Samsung Electronics Co., Ltd., Gyeonggi-do (KR)

(72) Inventors: Sang-Ki Kang, Gyeonggi-do (KR); Ki-Choon Gong, Seoul (KR); Kyung-Tae Kim, Gyeonggi-do (KR); Sung-Wan Youn, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/424,745

(22) PCT Filed: Aug. 29, 2013

(86) PCT No.: PCT/KR2013/007793
§ 371 (c)(1),
(2) Date: Feb. 27, 2015

(87) PCT Pub. No.: WO2014/035171
PCT Pub. Date: Mar. 6, 2014

(65) Prior Publication Data
US 2015/0222849 A1   Aug. 6, 2015

(30) Foreign Application Priority Data
Aug. 29, 2012   (KR) .................. 10-2012-0095254

(51) Int. Cl.
| H04N 7/14 | (2006.01) |
| H04L 29/08 | (2006.01) |
| H04L 29/06 | (2006.01) |
| H04L 12/811 | (2013.01) |

(Continued)

(52) U.S. Cl.
CPC .............. *H04N 7/147* (2013.01); *H04L 47/38* (2013.01); *H04L 47/72* (2013.01); *H04L 47/76* (2013.01); *H04L 65/4023* (2013.01); *H04L 67/06* (2013.01); *H04N 19/46* (2014.11)

(58) Field of Classification Search
USPC .......... 348/14.12, 14.13, 14.15, 21, 22, 518, 348/14.14, 384.1, E11.004, E11.006
See application file for complete search history.

(56) References Cited

U.S. PATENT DOCUMENTS

| 2003/0095570 A1 | 5/2003 | Uramatsu et al. |
| 2011/0169909 A1 | 7/2011 | Gu |

FOREIGN PATENT DOCUMENTS

| EP | 1 631 105 | * 5/2004 | ............... H04Q 7/38 |
| JP | 2007329682 | 12/2007 | |

(Continued)

OTHER PUBLICATIONS

PCT/ISA/237 Written Opinion issued on PCT/KR2013/007793 (pp. 5).

(Continued)

*Primary Examiner* — Yosef K Laekemariam
(74) *Attorney, Agent, or Firm* — The Farrell Law Firm, P.C.

(57) ABSTRACT

Provided is a method for transmitting a file during a video call including steps of confirming a first bandwidth for file transmission when a file transmission event is generated during a video call; reducing video call data on the basis of the first bandwidth for file transmission; and transmitting the reduced video call data and the corresponding file data through a second bandwidth for the video call, with the first bandwidth being a partial area or an entire area of the second bandwidth.

18 Claims, 12 Drawing Sheets

(51) Int. Cl.
*H04L 12/911* (2013.01)
*H04L 12/917* (2013.01)
*H04N 19/46* (2014.01)

(56) References Cited

FOREIGN PATENT DOCUMENTS

| KR | 1020050095280 | | 9/2005 | | |
|---|---|---|---|---|---|
| KR | 1020060069954 | | 6/2006 | | |
| KR | 1020070075134 | * | 7/2007 | .......... | H04W 19/164 |
| KR | 1020080092519 | * | 10/2008 | .......... | H04W 80/10 |
| KR | 1020080094463 | | 10/2008 | | |
| KR | 1020100005489 | | 1/2010 | | |
| KR | 1020100078143 | | 7/2010 | | |
| KR | 1020110041322 | | 4/2011 | | |

OTHER PUBLICATIONS

PCT/ISA/210 Search Report issued on PCT/KR2013/007793 (pp. 3).

* cited by examiner

METHOD AND APPARATUS FOR TRANSMITTING FILE DURING VIDEO CALL IN ELECTRONIC DEVICE

PRIORITY

This application is a National Stage application under 35 U.S.C. §371 of International Application No. PCT/KR2013/007793 filed Aug. 29, 2013, which claims priority under 35 U.S.C. §365(b) to Korean Patent Application Nos. 10-2012-0095254 filed Aug. 29, 2012, the content of each of which is incorporated herein by reference.

BACKGROUND OF THE INVENTION

1. Field of the Invention

The present invention relates generally to an electronic device, and more particularly, to a method and an apparatus for transmitting a large-capacity file during a video call in an electronic device.

2. Description of the Related Art

With the increase in the use of wireless communication and the increase of the wireless channel capacity, the necessity for Unified Communication (UC) is gradually increasing. The unified communication refers to a single system into which all communication means including a video call system as well as messenger, email, and phone call systems are incorporated, and unifies networks, communication equipment, software, etc., thereby implementing a use environment into which all communication systems of a company are incorporated on the basis of the Internet. The employment of the UC enables not only a rapid communication regardless of the location in a company, but also an extension to a mobile office environment using a smart phone.

In the unified communication environment, a user may send or receive a necessary document during a video call, and may sometimes share a large-capacity file. Although it is true that wireless channel capacity is increasing, the channel capacity is still limited. Further, in a wireless environment of the 3rd generation, the channel capacity is not sufficient even for only the video call. Therefore, for convenience which a user can actually feel, a situation requiring channel allocation between data required for a video call and the other data may occur.

Conventionally, in order to transmit a file to a counterpart terminal during a video call, the file is additionally transmitted together with video call data without deforming the video call image, or is transmitted by executing a separate file transmission application after the video call is terminated.

However, when a file is additionally transmitted without deforming a video call image during a video call, if the bandwidth for transmitting two types of information (video call information and transmission file information) is not sufficient, not only the file transmission time is delayed but video call image packets may also be lost or delayed, which degrades the quality of the video call.

Meanwhile, when a file is transmitted by executing a separate file transmission application after the video call is terminated, a user is required to control a separate file transmission application after the video call is terminated and execute the separate file transmission application, which may be inconvenient for the user. In other words, when the user wants to go on having the video call even after transmitting the file, the user should execute the video call program again, which gives inconvenience to the user and degrades use convenience for the user.

Therefore, a method and an apparatus for efficiently transmitting a file during a video call is necessary.

DISCLOSURE OF THE INVENTION

Technical Object

An aspect of the present invention is to provide a method and an apparatus for transmitting a file during a video call in an electronic device.

Another aspect of the present invention is to provide a method and an apparatus for transmitting a file without an interruption of a video call.

Another aspect of the present invention is to reduce a delay in transmitting a file during a video call.

Another aspect of the present invention is to provide a method and an apparatus for transmitting a file using a bandwidth secured by reducing a bandwidth for a video call.

Solution

According to a first aspect of the present invention in order to achieve the above purposes, a method for transmitting a file during a video call includes: identifying a first bandwidth for file transmission when a file transmission event is generated during a video call; reducing video call data on the basis of the first bandwidth for file transmission; and transmitting the reduced video call data and corresponding file data through a second bandwidth for the video call, wherein the first bandwidth is a partial area or an entire area of the second bandwidth.

According to a second aspect of the present invention in order to achieve the above purposes, a method for receiving a file during a video call includes: receiving reduced video call data and corresponding file data through a bandwidth for the video call; and decoding and then displaying, on a screen, the reduced video call data, simultaneously while processing and then displaying, on the screen, the corresponding file data.

According to a third aspect of the present invention in order to achieve the above purposes, an electronic device includes at least one processor; a memory; and at least one program stored in the memory and configured to be executed by the at least one processor, wherein the program includes commands for identifying a first bandwidth for file transmission when a file transmission event is generated during a video call, reducing video call data on the basis of the first bandwidth for file transmission, and transmitting the reduced video call data and corresponding file data through a second bandwidth for the video call, and the first bandwidth is a partial area or an entire area of the second bandwidth.

According to a fourth aspect of the present invention in order to achieve the above purposes, an electronic device includes at least one processor; a memory; and at least one program stored in the memory and configured to be executed by the at least one processor, wherein the program includes commands for receiving reduced video call data and corresponding file data through a bandwidth for the video call, and decoding and then displaying, on a screen, the reduced video call data, simultaneously while processing and then displaying, on the screen, the corresponding file data.

Effect of the Invention

As described above, the present invention can reduce video call packet loss and file transmission delay during a video call by securing a channel bandwidth required for file transmission by modifying video call data during the video call. Further, a user can achieve a stable file transmission in a channel condition having a reduced packet loss while maintaining a video call.

BRIEF DESCRIPTION OF THE DRAWINGS

The above and other aspects, features and advantages of certain exemplary embodiments of the present invention will be more apparent from the following description taken in conjunction with the accompanying drawings in which.

DETAILED DESCRIPTION OF EXEMPLARY EMBODIMENTS

Hereinafter, exemplary embodiments of the present invention will be described in detail with reference to the accompanying drawings. Further, in the following description of the present invention, a detailed description of known functions or configurations incorporated herein will be omitted when it may make the subject matter of the present invention rather unclear. Meanwhile, terms described later are defined in consideration of the functions of the present disclosure, but the meaning of the terms may be changed according to a user, intention of an operator, or convention. Accordingly, the terms should be defined based on the contents over the whole present specification.

Hereinafter, a method and an apparatus for transmitting a file during a video call in an electronic device according to the present invention will be described. The electronic device may be a device, such as a portable terminal, a mobile phone, a mobile pad, a media player, a tablet computer, a handheld computer, video conferencing equipment and system, a camera including a communication module for transmitting a photograph, or a Personal Digital Assistant (PDA). Further, the electronic device may be a predetermined electronic device including a device having a combination of two or more functions among the above-enumerated devices.

Figure 1:
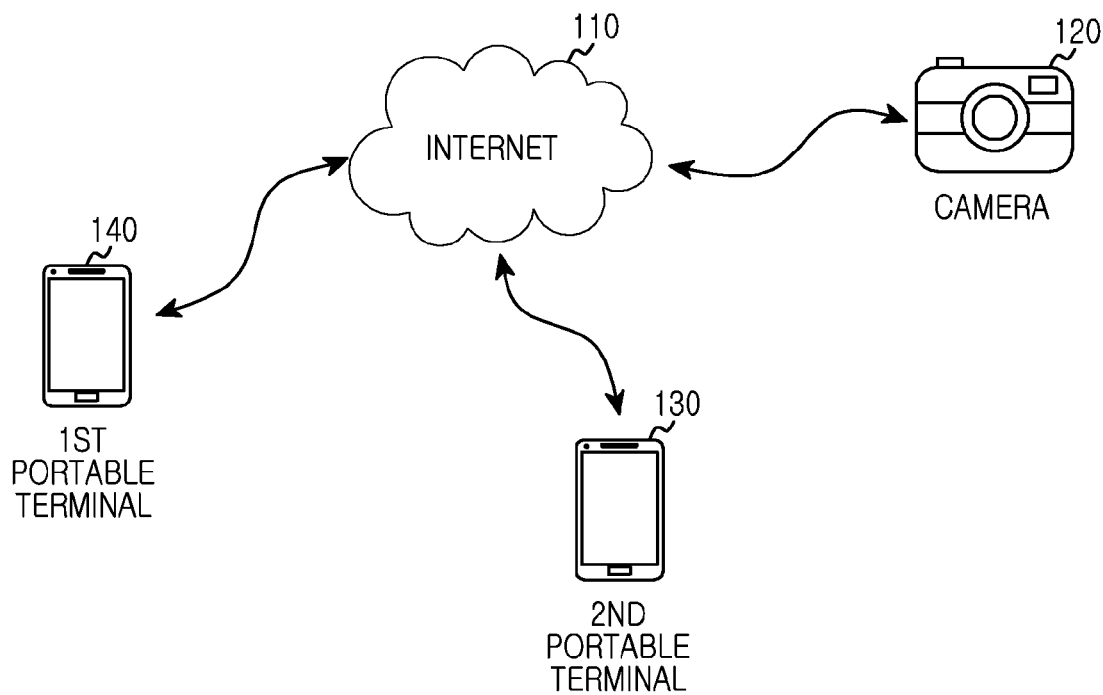
FIG. 1 illustrates a wireless communication environment according to an embodiment of the present invention.

FIG. 1 illustrates a wireless communication environment according to an embodiment of the present invention.

Referring to FIG. 1, portable terminals 130 and 140 and a camera 120 including a communication module capable of accessing an Internet network (or referred to also as IP network) 110 can exchange information through the Internet network 110. The IP-based Internet network 110 transfers packet data corresponding to voice data and image data from a source to a target. For example, the Internet network 110 transfers packets corresponding to voice data and image data during a video call between the portable terminals 130 and 140 or during a video call between the portable terminal 130 or the portable terminal 140 and the camera 120. In the present invention, when a corresponding device transmits a file to a counterpart device during a video call between portable terminals or during a video call between a portable terminal and a camera 120, the corresponding device secures a bandwidth for the transmission of a file by reducing the size of image data and then transmits the file and the size-reduced image data through the bandwidth for the voice call. A more detailed description on the file transmission during a voice call will be given below with reference to FIGS. 3 to 8B.

Each of the camera 120 and the portable terminals 130 and 140 includes a communication module which can access an Internet network, and can transmit or receive data using a corresponding protocol. The corresponding protocol follows, without being limited thereto, a Global System for Mobile Communication (GSM) communication scheme, an Enhanced Data GSM Environment (EDGE) communication scheme, a Code Division Multiple Access (CDMA) communication scheme, a W-Code Division Multiple Access (W-CDMA) communication scheme, a Long Term Evolution (LTE) communication scheme, an Orthogonal Frequency Division Multiple Access (OFDMA) communication scheme, a Wireless Fidelity (Wi-Fi) communication scheme, a WiMax communication scheme and/or a Bluetooth communication scheme.

Figure 2:
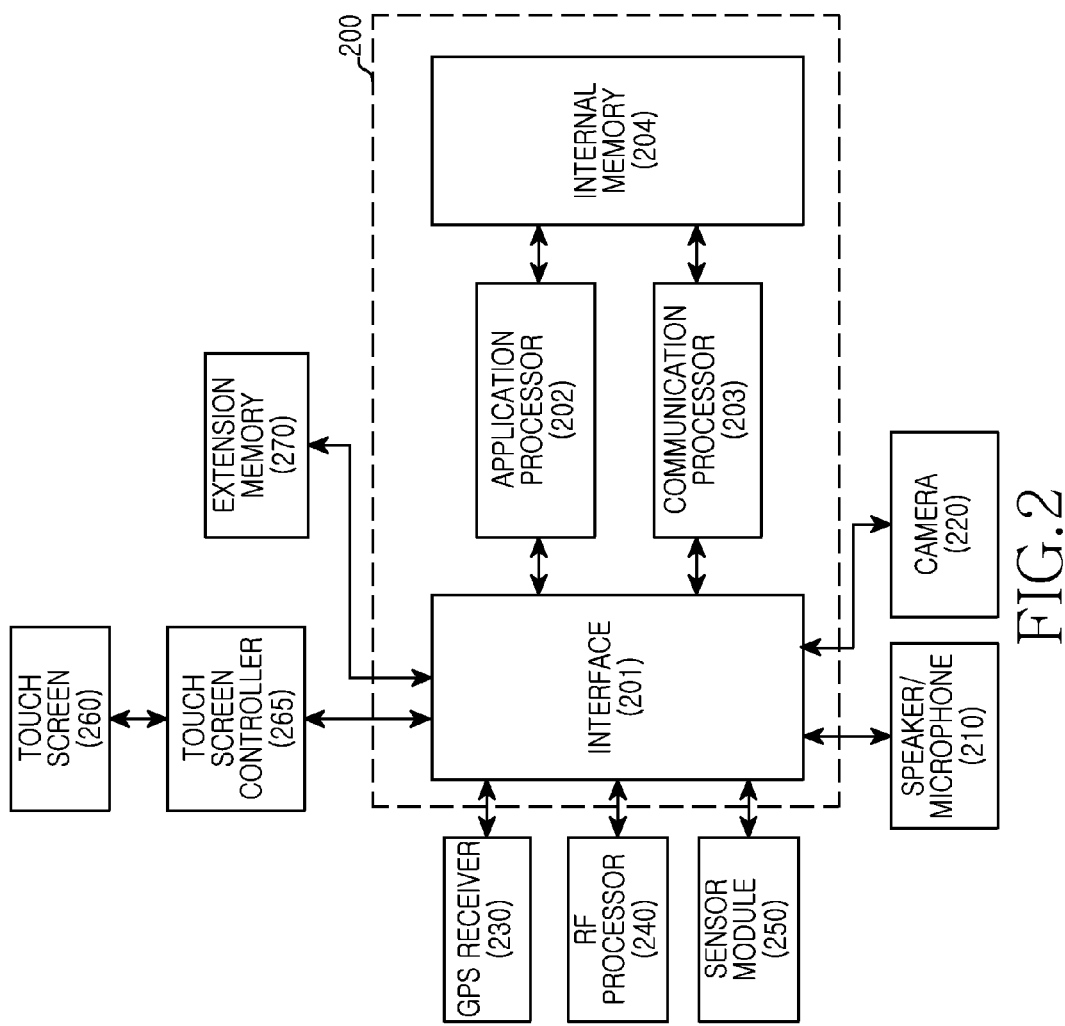
FIG. 2 illustrates a portable terminal according to an embodiment of the present invention.

FIG. 2 illustrates a portable terminal according to an embodiment of the present invention.

Referring to FIG. 2, the portable terminal includes a controller 200, a speaker/microphone 210, a camera 220, a GPS receiver 230, an RF processor 240, a sensor module 250, a touch screen 260, a touch screen controller 265, and an extension memory 270.

The controller 200 may include an interface 201, one or more processors 202 and 203, and an internal memory 204. In some cases, the entire controller 200 itself may be called a processor. The interface 201, the application processor 202, the communication processor 203, and the internal memory 204 either may be separate elements or may be integrated in at least one integrated circuit.

The application processor 202 performs various functions for the electronic device by executing various software programs, and the communication processor 203 performs processing and control for voice call and data call. Further, in addition to the ordinary functions as described above, the processors 202 and 203 may execute a particular software module (command set) stored in the extension memory 270 or the internal memory 204, thereby performing various particular functions corresponding to the modules. That is, the processors 202 and 203 may perform a method according to an embodiment of the present invention by interworking with software modules stored in the extension memory 270 or the internal memory 204.

In an embodiment for file transmission during a video call in an electronic device according to the present invention, the application processor 202 configures a video communication and starts a video call with a counterpart device according to a pre-defined video call process (e.g. H.323 protocol). When a file transmission request event of a user is generated during the video call, the application processor 202 identifies an available channel capacity or an available channel band on the basis of the state of the communication channel (e.g. WiFi, 3G, wired Internet, etc.) or a current video call data transmission rate. When a rapid file transmission is required, the application processor 202 reduces image information by lowering the size (resolution) of the image, the compression rate (coding bit-rate) of the image, and the frame speed (Frame Per Second; FPS) of the image, and transmits a file through a bandwidth secured from the entire bandwidth for the video call. Moreover, the application processor 202 modifies video call data in accordance with the configured image size, image compression rate, and frame speed, and then transmits the modified image data to a counterpart device through the remaining bandwidth except for the bandwidth for the file transmission among the entire bandwidth for the video call. Then, the application processor 202 determines whether the file transmission has been completed. When the file transmission has been completed, the application processor 202 displays the completion of the file transmission to all parties of the video call and reconstructs and transmits the video call data.

In this process, in order to maximize the secured bandwidth, a method of never transmitting image information at all may be taken into consideration.

In addition, when a rapid file transmission is not required, the application processor 202 may delay the file transmission and transmit the file when there is a space in the bandwidth for the video call.

According to the implementation, the application processor 202 may inquire about and receive a file format which a receiver wants, and may transmit a file in the file format which the receiver wants.

In an embodiment for file reception during a video call in an electronic device according to the present invention, when a file reception event occurs, the application processor 202 receives information (e.g. the size of a modified image, an image compression ratio, and an image frame speed) relating to reduced video call data. Further, the application processor 202 receives a file through a first bandwidth among the bandwidth for the video call, and receives video call data on the basis of the information relating to the reduced video call data through a second bandwidth. Moreover, the application processor 202 decodes video call data, displays the decoded data on a part or the entire of a screen, and correspondingly processes the received file. For example, when the received file is a video file, the application processor 202 reproduces and displays the file on a part of a screen or the entire screen using a media player. When the received file is a still image file, the application processor 202 displays the file on a part of a screen or the entire screen. Further, when the received file is a document, the application processor 202 executes a corresponding application and displays the contents of the document.

According to the implementation, when a file reception event occurs, the application processor 202 transmits information on a desired file format to a counterpart device on the basis of screen conditions and use of the file, receives a file in a file format which the processor itself wants through a first bandwidth among the bandwidth for a video call, and receives video call data through a second bandwidth on the basis of information relating to the reduced video call data.

Further, various functions of an electronic device according to the present invention, which have been described above and will be described below, may be executed by hardware, software, and/or a combination thereof, which include at least one processing and/or Application Specific Integrated Circuit (ASIC).

Meanwhile, another processor (not shown) may include one or more data processors, image processors, or CODECs. The data processor, the image processor, and the CODEC may be separately configured. Further, they may be configured as a plurality of processors performing different functions. The interface 201 is connected to the touch screen controller 265 and the extension memory 270 of the electronic device.

The sensor module 250 may be connected with the interface 201 to enable various functions. For example, a motion sensor or an optical sensor may be connected with the interface 201 to enable detection of a motion of the electronic device and detection of light from the outside, respectively. Moreover, other sensors, such as a positioning system, a temperature sensor, and a biological sensor, may be connected with the interface 201 to perform related functions.

The camera 220 may be connected with the sensor module 250 through the interface 201 to perform camera functions including photographing and video clip recording.

In the present invention, the camera 220 takes an image to be transmitted to a counterpart terminal during a video call.

The RF processor 240 performs a communication function. For example, under the control of the communication processor 203, the RF processor 240 converts an RF signal to a baseband signal and provides the converted baseband signal to the communication processor 203 or converts a baseband signal from the communication processor 203 to an RF signal and transmits the converted RF signal. Here, the communication processor 203 processes the baseband signal according to various communication schemes. For example, the communication schemes may include, without being limited thereto, a Global System for Mobile Communication (GSM) communication scheme, an Enhanced Data GSM Environment (EDGE) communication scheme, a Code Division Multiple Access (CDMA) communication scheme, a W-Code Division Multiple Access (W-CDMA) communication scheme, a Long Term Evolution (LTE) communication scheme, an Orthogonal Frequency Division Multiple Access (OFDMA) communication scheme, a Wireless Fidelity (Wi-Fi) communication scheme, a WiMax communication scheme and/or a Bluetooth communication scheme.

In the present invention, the RF processor 240 transmits communication image/voice information for a video call to a counterpart terminal and receives video call data (image and voice) from the counterpart terminal.

The speaker/microphone 210 may perform input and output of an audio stream, such as voice recognition, voice copy, digital recording, and phone call function. That is, the speaker/microphone 210 converts a voice signal to an electric signal or converts an electric signal to a voice signal. Although not shown, an attachable and detachable earphone, headphone, or headset may be connected with the electronic device through an external port.

In the present invention, the speaker/microphone 210 receives input voice necessary for a video call or outputs voice received from a counterpart.

The touch screen controller 265 may be connected with the touch screen 260. The touch screen 260 and the touch screen controller 265 may detect, without being limited thereto, a contact, a movement, or an interruption thereof, using not only capacitive, resistive, infrared ray, and surface sound wave technologies for determining one or more contact points with the gesture screen 260 but also certain multi-touch detection technologies including other proximity sensor arrays or other elements.

The touch screen 260 provides an input/output interface between the electronic device and a user. That is, the touch screen 260 transfers a touch input of a user to the electronic device. Further, the touch screen is a medium that shows an output from the electronic device to the user. That is, the touch screen shows a visual output to the user. Such a visual output appears in the form of a text, a graphic, a video, or a combination thereof.

Further to the present invention, the touch screen 260 displays an image (i.e. image displayed on a counterpart terminal during the video call) taken by the camera 220 and an image received from the counterpart terminal.

The touch screen 260 may employ various displays. For example, without being limited thereto, the touch screen may employ a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The GPS receiver 230 converts a signal received from a satellite into information including position, speed, and time. For example, the distance between a satellite and a GPS receiver can be calculated by multiplying the speed of light by the time for the arrival of the signal, and the position of the electronic device can be obtained according to the known principle of triangulation by calculating the exact positions and distances of three satellites.

The extension memory 270 or internal memory 204 may include at least one high speed random access memory and/or non-volatile memory, such as a magnetic disc storage device, at least one optical storage device, and/or a flash memory (e.g. NAND or NOR).

The extension memory 270 or internal memory 204 stores software. Software elements include an operating system software module, a communication software module, a graphic software module, a user interface software module, and an MPEG module, a camera software module, and at least one application software module. Further, since a module, which is an element of software, may be expressed as a set of instructions, the module is also expressed as an instruction set. The module is also expressed as a program.

Further to the present invention, the extension memory 270 or the internal memory 204 stores a program for a video call and transmission of a file and information relating to the file to be transmitted.

The operating system software includes various software elements for controlling general system operations. The control of such general system operations refers to, for example, memory management and control, storage hardware (device) management and control, and power management and control. Such operating system software also performs a function of smoothening communication between various hardware (devices) and software elements (modules).

The communication software module can enable a communication with another electronic device, such as a computer, a server and/or a portable terminal, through the RF processor 240. Further, the communication software module has a protocol structure corresponding to a relevant communication scheme.

The graphic software module includes various software elements for providing and displaying graphics on the touch screen 260. The term "graphics" is used to have a meaning including text, web page, icon, digital image, video, and animation.

The user interface software module includes various software elements relating to a user interface. The user interface software module includes information on how the state of the user interface changes or what condition changes the state of the user interface.

The camera software module includes camera-related software elements which enable camera-related processes and functions. The application module includes a browser, an email, an instant message, a word processing, a keyboard emulation, an address book, a touch list, a widget, a Digital Right Management (DRM), a voice recognition, a voice copy, a position determining function, and a location based service. Each of the memories 270 and 204 may include an additional module (instructions) as well as the modules described above. Otherwise, the memories may not use some modules (instructions) when necessary.

In relation to the present invention, the application module includes instructions (see FIGS. 3 to 8*b* described below) for file transmission during a video call in an electronic device of the present invention.

Instructions according to an embodiment for file transmission during a video call in an electronic device of the present invention include instructions for configuring a video communication and starting a video call with a counterpart device according to a pre-defined video call process (e.g. H.323 protocol); when a file transmission request event of a user is generated during the video call, identifying an available channel capacity or an available channel band on the basis of the state of the communication channel (e.g. WiFi, LTE, 3G, wired Internet, etc.) or a current video call data transmission rate; when a rapid file transmission is required, reducing image information by lowering the size (resolution) of the image, the compression rate (coding bit-rate) of the image, and the frame speed (Frame Per Second; FPS) of the image, and transmitting a file through a bandwidth secured from the entire bandwidth for the video call; modifying video call data in accordance with the configured image size, image compression rate, and frame speed, and then transmitting the modified image data to a counterpart device through the remaining bandwidth except for the bandwidth for the file transmission among the entire bandwidth for the video call; determining whether the file transmission has been completed; and when the file transmission has been completed, displaying the completion of the file transmission to all parties of the video call and reconstructing and transmitting the video call data.

In this process, in order to maximize the secured bandwidth, a method of never transmitting image information at all may be taken into consideration.

In addition, the instructions include an instruction for, when a rapid file transmission is not required, delaying the file transmission and transmitting the file when there is a space in the bandwidth for the video call.

According to the implementation, the instructions include an instruction for inquiring about and receiving a file format which a receiver wants, and transmitting a file in the file format which the receiver wants.

Instructions according to an embodiment for file reception during a video call in an electronic device of the present invention receive information (e.g. the size of a modified image, an image compression ratio, and an image frame speed) relating to reduced video call data when a file reception event occurs, receive a file through a first bandwidth among the bandwidth for the video call, receive video call data on the basis of the information relating to the reduced video call data through a second bandwidth, decode reduced video call data and display the decoded data on a part or the entire of a screen, and correspondingly process the received file. For example, the instructions include an instruction for, when the received file is a video file, reproducing and displaying the file on a part of a screen or the entire screen using a media player; when the received file is a still image file, displaying the file on a part of a screen or the entire screen; and when the received file is a document, executing a corresponding application and displaying the contents of the document.

According to the implementation, the instructions include an instruction for, when a file reception event occurs, transmitting information on a desired file format to a counterpart device on the basis of screen conditions and use of the file, receiving a file in a file format which the processor itself wants through a first bandwidth among the bandwidth for a video call, and receiving video call data through a second bandwidth on the basis of information relating to the reduced video call data.

Further, various functions of an electronic device according to the present invention, which have been described above and will be described below, may be executed by hardware, software, and/or a combination thereof, which include at least one processing and/or Application Specific Integrated Circuit (ASIC).

Figure 3:
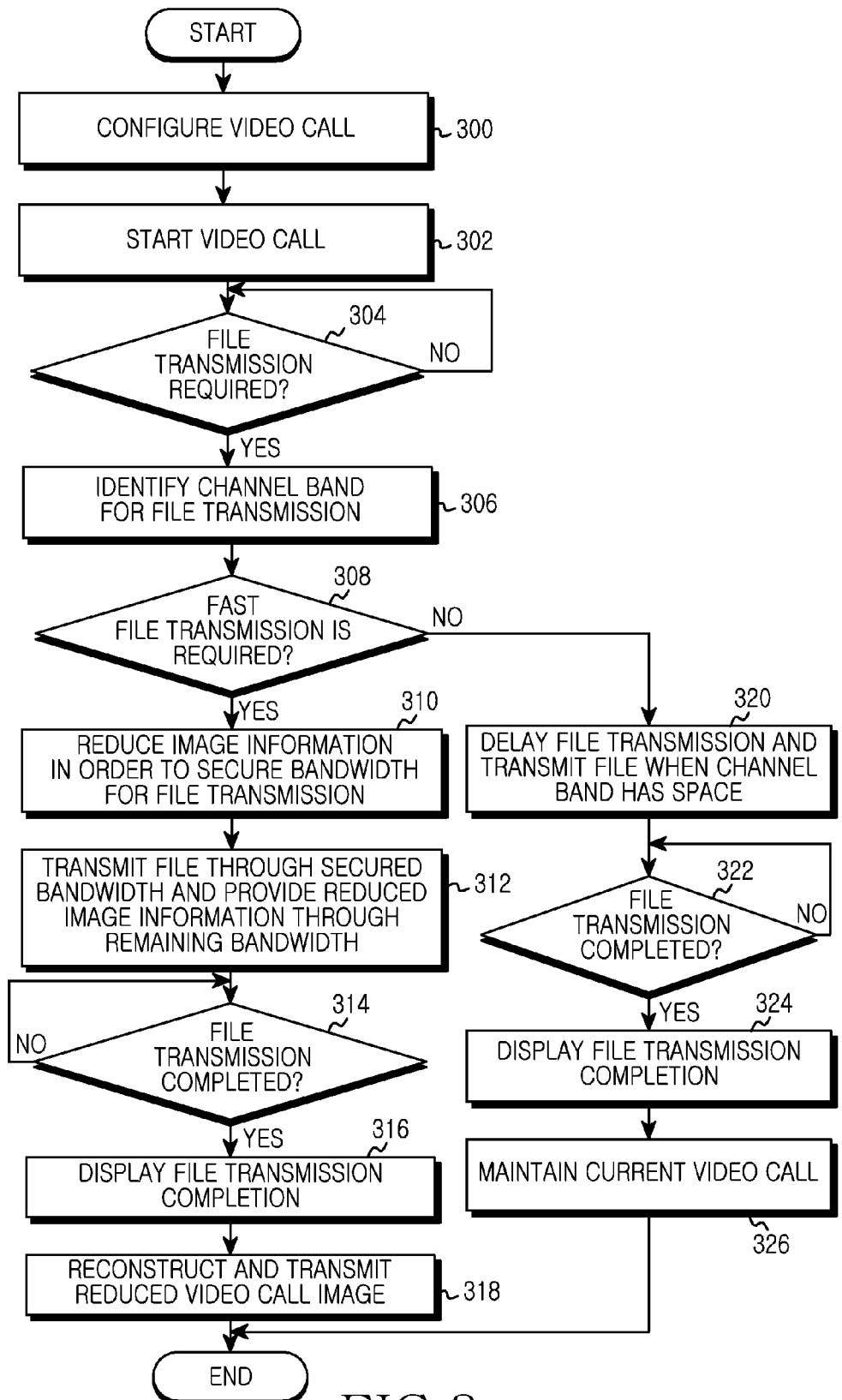
FIG. 3 is a flowchart illustrating a process of transmitting a file during a video call according to a first embodiment of the present invention.

FIG. 3 is a flowchart illustrating a process of transmitting a file during a video call according to a first embodiment of the present invention.

Referring to FIG. 3, a portable terminal configures a video communication with a counterpart device according to a predefined video call process (e.g. H.323 protocol) in operation 300 and starts the configured video call in step 302. For example, portable terminals exchange available video codec and audio codec with each other according to a predefined video call process, and then start a video call through the determined video codec and audio codec.

Thereafter, when a file transmission request event of a user occurs during a video call in step 304, the portable terminal proceeds to step 306 in which the portable terminal identifies an available channel capacity or available channel band for file transmission. Here, the available channel capacity for a transmission file may be determined on the basis of the state of a communication channel (e.g. WiFi, LTE, 3G, wired Internet, etc.). Otherwise, the available channel capacity for a transmission file may be determined on the basis of a current video call data transmission rate.

Thereafter, when a fast file transmission is required in step 308, the portable terminal proceeds to step 310 in which the portable terminal reduces image information in order to secure a bandwidth for file transmission. In other words, the portable terminal reduces the bandwidth for the video call and secures a bandwidth for file transmission using the reduced video call bandwidth.

Here, in order to reduce the image information, the portable terminal may lower the size (resolution) of the image, the compression rate (coding bit-rate) of the image, and the image frame speed (Frame Per Second; FPS).

Then, in step 312, the portable terminal transmits a file through the secured bandwidth from the entire bandwidth for the video call, modifies video call data in accordance with the configured image size, image compression rate, and frame speed, and then transmits the modified image data to a counterpart device through the remaining bandwidth except for the bandwidth for the file transmission among the entire bandwidth for the video call. That is, while the modified video call image is transferred, the portable terminal can transmit a file that a user wants to transmit. Further, according to the type of the transmitted file, the file may be displayed on the counterpart device through a corresponding application. For example, an image is displayed in the case of an image file, and contents of a document are displayed through a corresponding document making application in the case of a document file.

According to the implementation, the entire bandwidth for the video call may be used for the file transmission. In this event, only voice data is transmitted while the video call data is not transmitted.

Thereafter, in step 214, the portable terminal determines whether the file transmission has been completed. When the file transmission has been completed, the portable terminal proceeds to step 316 in which the portable terminal displays, to all parties of the video call, the completion of the file transmission.

Further, when the file transmission has been completed in step 314, the portable terminal reconstructs and transmits the video call data. That is, the portable terminal ceases modifying the video call data in order to secure the file transmission bandwidth and transmits the video call data with the original image size, image compression rate, and frame speed before the modification.

Meanwhile, when a rapid file transmission is not required in step 308, the portable terminal proceeds to step 320 in which the portable terminal delays the file transmission and transmits the file when there is a space in the bandwidth for the video call. For example, when there is not a big change in the image to be transmitted to the counterpart device, the size of the video call data to be transmitted is small and a large bandwidth is thus unnecessary.

Thereafter, in step 322, the portable terminal determines whether the file transmission has been completed. When the file transmission has been completed, the portable terminal proceeds to step 324 in which the portable terminal displays, to all parties of the video call, the completion of the file transmission.

Further, in step 326, the portable terminal maintains the video call with the pre-configured image size, image compression rate, and frame speed.

As described above, when a file is to be transmitted in response to a request from a user during a video call, the video call data is reduced in accordance with the channel state and the reduction of the video call data is ceased when the file transmission has been completed.

Thereafter, the process of the present invention is terminated.

As described above, when a file is to be transmitted in response to a request from a user during a video call, the video call data is reduced in accordance with the channel state and the reduction of the reduction of the video call data is ceased when the file transmission has been completed.

Figure 4:
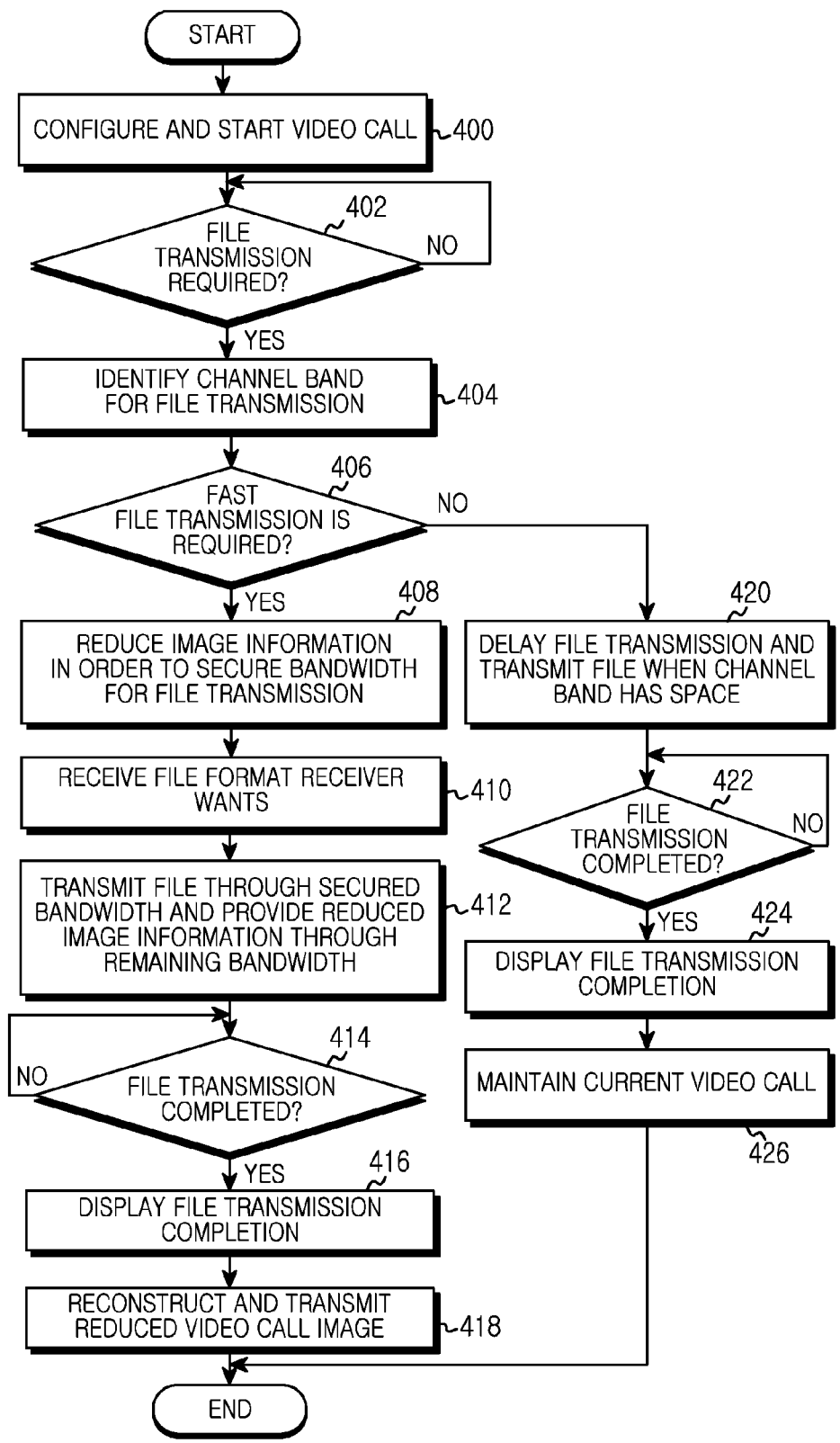
FIG. 4 is a flowchart illustrating a process of transmitting a file during a video call according to a second embodiment of the present invention.

FIG. 4 is a flowchart illustrating a process of transmitting a file during a video call according to a second embodiment of the present invention.

Referring to FIG. 4, a portable terminal configures a video communication with a counterpart device according to a predefined video call process (e.g. H.323 protocol) and starts the configured video call in step 400. For example, portable terminals exchange available video codec and audio codec with each other according to a predefined video call process, and then start a video call through the determined video codec and audio codec.

Thereafter, when a file transmission request event of a user occurs during a video call in step 402, the portable terminal proceeds to step 404 in which the portable terminal identifies an available channel capacity or available channel band for file transmission. Here, the available channel capacity for a transmission file may be determined on the basis of the state of a wireless channel (e.g. WiFi, LTE, etc.). Otherwise, the available channel capacity for a transmission file may be determined on the basis of a current video call data transmission rate.

Thereafter, when a fast file transmission is required in step 406, the portable terminal proceeds to step 408 in which the portable terminal reduces image information in order to secure a bandwidth for file transmission. In other words, the portable terminal reduces the bandwidth for the video call and secures a bandwidth for file transmission using the reduced video call bandwidth.

Here, in order to reduce the image information, the portable terminal may lower the size (resolution) of the image, the compression rate (coding bit-rate) of the image, and the image frame speed (Frame Per Second; FPS).

Thereafter, in step 410, the portable terminal inquires about and receives a file format which a receiver wants.

That is, a file to be transmitted may be configured in various formats. For example when the file is a file corresponding to a still image, the file be configured to have various image sizes. In this event, a choice for the size of an image, which the receiver wants to receive, may be given to the receiver. The receiver may receive an image of a proper size according to the screen condition of the purpose of use, thereby reducing the time for the transmission.

Then, in step 412, the portable terminal transmits a file in a file format, which the receiver wants, through a bandwidth secured from the entire bandwidth for the video call, modifies video call data in accordance with the configured image size, image compression rate, and frame speed, and then transmits the modified image data to a counterpart device through the remaining bandwidth except for the bandwidth for the file transmission among the entire bandwidth for the video call. That is, while the modified video call image is transferred, the portable terminal can transmit a file, which a user wants to transmit. Further, according to the type of the transmitted file, the file may be displayed on the counterpart device through a corresponding application. For example, an image is displayed in the case of an image file, and contents of a document are displayed through a corresponding document making application in the case of a document file.

According to the implementation, the entire bandwidth for the video call may be used for the file transmission. In this event, only voice data is transmitted while the video call data is not transmitted.

Thereafter, in step 414, the portable terminal determines whether the file transmission has been completed. When the file transmission has been completed, the portable terminal proceeds to step 416 in which the portable terminal displays, to all parties of the video call, the completion of the file transmission.

Further, when the file transmission has been completed in step 414, the portable terminal reconstructs and transmits the video call data in step 418. That is, the portable terminal ceases modifying the video call data in order to secure the file transmission bandwidth and transmits the video call data with the original image size, image compression rate, and frame speed before the modification.

Meanwhile, when a rapid file transmission is not required in step 406, the portable terminal proceeds to step 420 in which the portable terminal delays the file transmission and transmits the file when there is a space in the bandwidth for the video call. For example, when there is not a big change in the image to be transmitted to the counterpart device, the size of the video call data to be transmitted is small and a large bandwidth is thus unnecessary.

Thereafter, in step 422, the portable terminal determines whether the file transmission has been completed. When the file transmission has been completed, the portable terminal proceeds to step 424 in which the portable terminal displays, to all parties of the video call, the completion of the file transmission.

Further, in step 426, the portable terminal maintains the video call with the pre-configured image size, image compression rate, and frame speed.

Thereafter, the process of the present invention is terminated.

Figure 5:
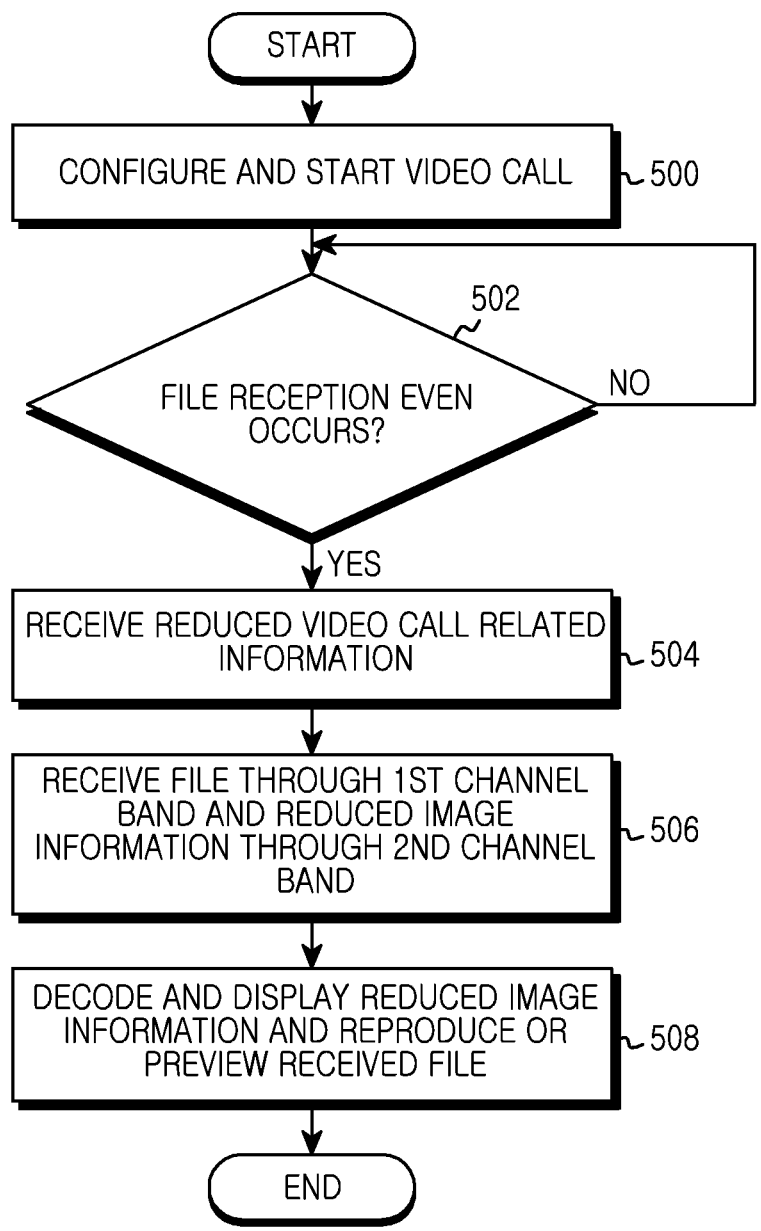
FIG. 5 is a flowchart illustrating a process of receiving a file during a video call according to a first embodiment of the present invention.

FIG. 5 is a flowchart illustrating a process of receiving a file during a video call according to a first embodiment of the present invention.

Referring to FIG. 5, a portable terminal configures a video communication with a counterpart device according to a predefined video call process (e.g. H.323 protocol) and starts the configured video call in step 500. For example, portable terminals exchange available video codec and audio codec with each other according to a predefined video call process, and then start a video call through the determined video codec and audio codec.

Thereafter, when a file reception event occurs in step 502, the portable terminal proceeds to step 504 in which the portable terminal receives information relating to reduced video call data. For example, the portable terminal receives information on the image size, image compression rate, and image frame speed changed in order to reduce the image information.

Then, in step 506, the portable terminal receives a file through a first bandwidth among the bandwidth for the video call, and receives video call data on the basis of the information relating to the reduced video call data through a second bandwidth.

According to the implementation, the entire bandwidth for the video call may be used for the file transmission. In this event, the portable terminal may receive only voice data together with a file, without receiving image data.

Then, in step 508, the portable terminal decodes the reduced video call data, displays the decoded data on a part or the entire of a screen, and processes the received file. For example, when the received file is a video file, the portable terminal reproduces and displays the file on a part of a screen or the entire screen using a media player. When the received file is a still image file, the portable terminal displays the file on a part of a screen or the entire screen. Further, when the received file is a document, the portable terminal executes a corresponding application and displays the contents of the document.

Thereafter, the process of the present invention is terminated.

Figure 6:
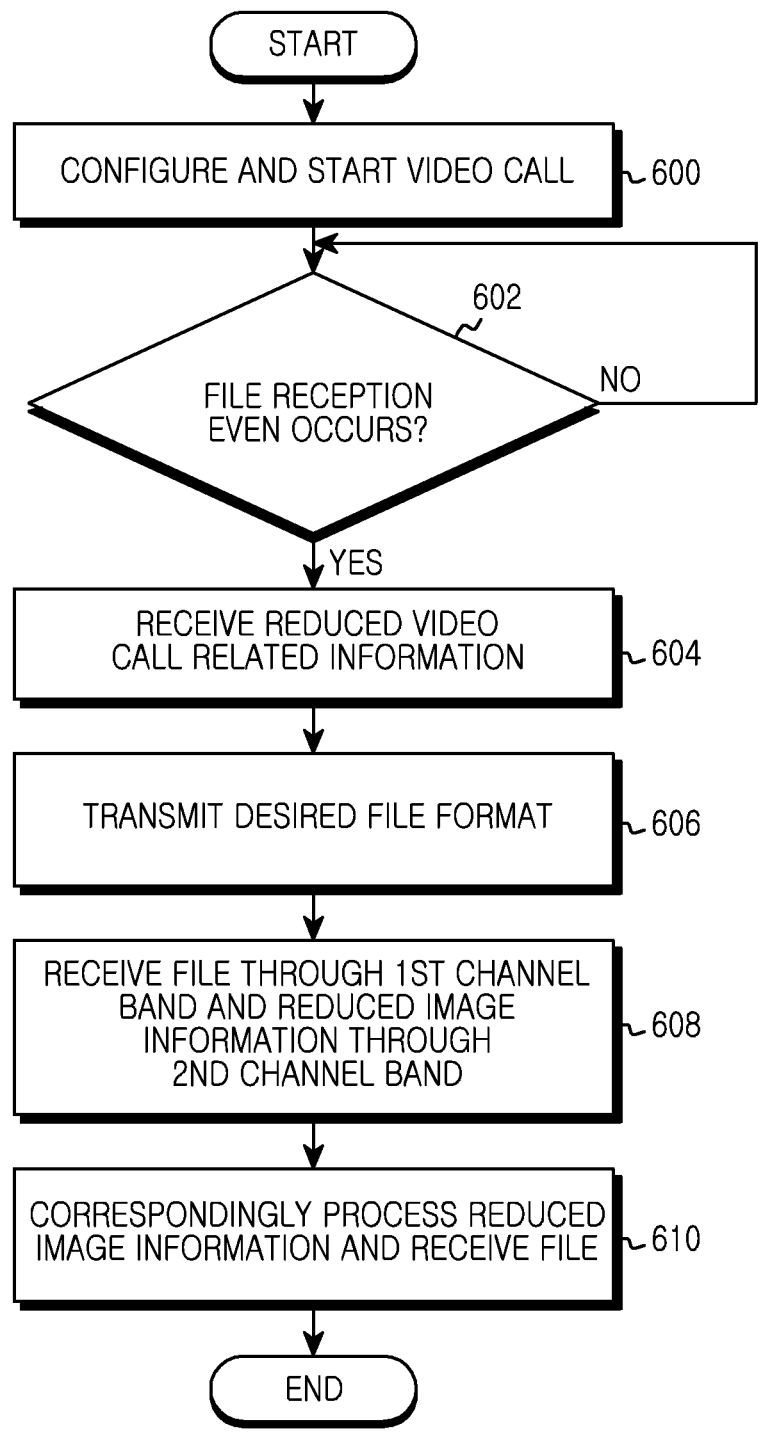
FIG. 6 is a flowchart illustrating a process of receiving a file during a video call according to a second embodiment of the present invention.

FIG. 6 is a flowchart illustrating a process of receiving a file during a video call according to a second embodiment of the present invention.

Referring to FIG. 6, a portable terminal configures a video communication with a counterpart device according to a predefined video call process (e.g. H.323 protocol) and starts the configured video call in step 600. For example, portable terminals exchange available video codec and audio codec with each other according to a predefined video call process, and then start a video call through the determined video codec and audio codec.

Thereafter, when a file reception event occurs in step 602, the portable terminal proceeds to step 604 in which the portable terminal receives information relating to reduced video call data. For example, the portable terminal receives information on the image size, image compression rate, and image frame speed changed in order to reduce the image information.

Further, in step 606, the portable terminal transmits information on a desired file format on the basis of a screen condition and purpose of use of the file to a transmitter side device in response to a request from the transmitter side device.

Then, in step 608, the portable terminal receives a file in a file format, which the portable terminal itself wants, through a first bandwidth among the bandwidth for the video call, and receives video call data on the basis of the information relating to the reduced video call data through a second bandwidth.

According to the implementation, the entire bandwidth for the video call may be used for the file transmission. In this event, the portable terminal may receive only voice data together with a file, without receiving image data.

Then, in step 610, the portable terminal decodes the reduced video call data, displays the decoded data on a part or the entire of a screen, and processes the received file. For example, when the received file is a video file, the portable terminal reproduces and displays the file on a part of a screen or the entire screen using a media player. When the received file is a still image file, the portable terminal displays the file on a part of a screen or the entire screen. Further, when the received file is a document, the portable terminal executes a corresponding application and displays the contents of the document.

Thereafter, the process of the present invention is terminated.

Figure 7A:
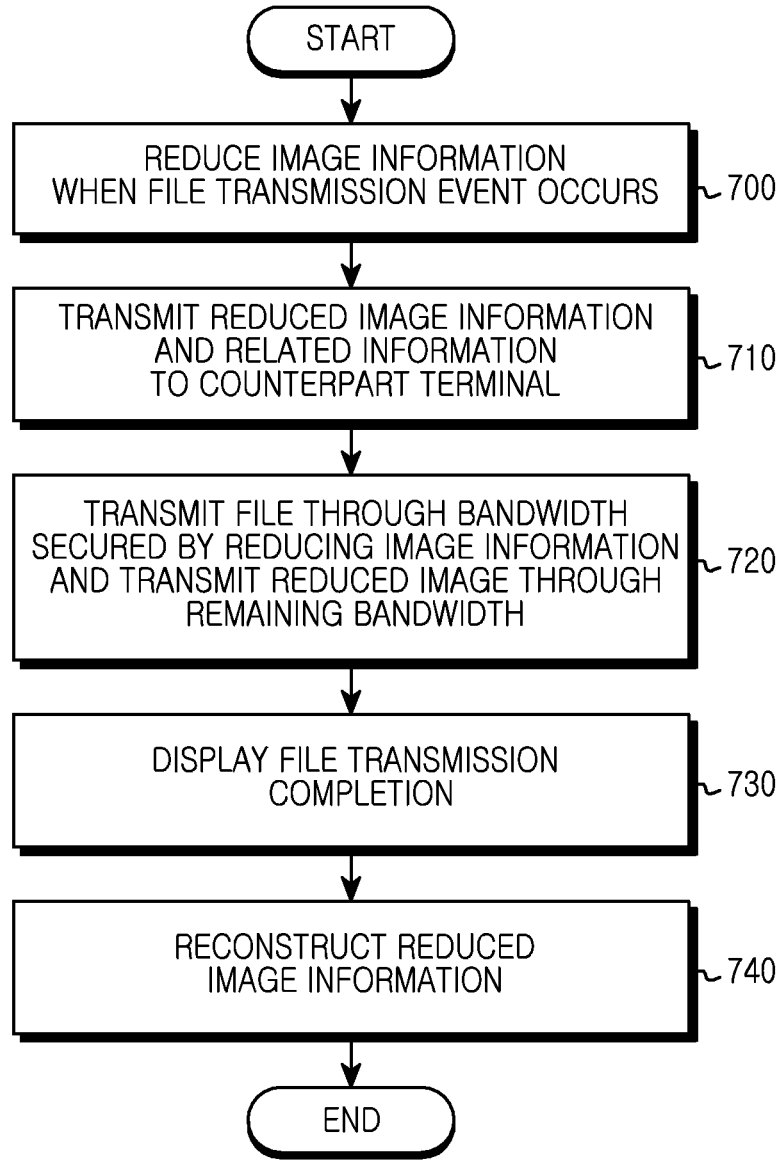
FIG. 7a is a flowchart illustrating a process of transmitting a file during a video call according to another embodiment of the present invention.

FIG. 7a is a flowchart illustrating a process of transmitting a file during a video call according to another embodiment of the present invention.

First, when a file transmission event occurs during a video call, an electronic device reduces video call data (including image data and voice data) in consideration of the size of a file to be transmitted (step 700). That is, the electronic device reduces the size of image data by changing parameters, such as the image size, image compression rate, and image frame speed.

Next, the electronic device transmits information on the reduced video call data and related information to a counterpart device (step 710), and transmits a file through a bandwidth secured by reducing the video call data while transmitting the reduced video call data through the other bandwidth (step 720).

Meanwhile, when the file transmission has been completed, the completion of the file transmission is displayed to all parties of the video call (step 730). Further, after the file transmission is completed, the electronic device reconstructs the reduced video call data (step 740). That is, the portable terminal performs the video call with the original image size, image compression rate, and image frame speed before the reduction.

Figure 7B:
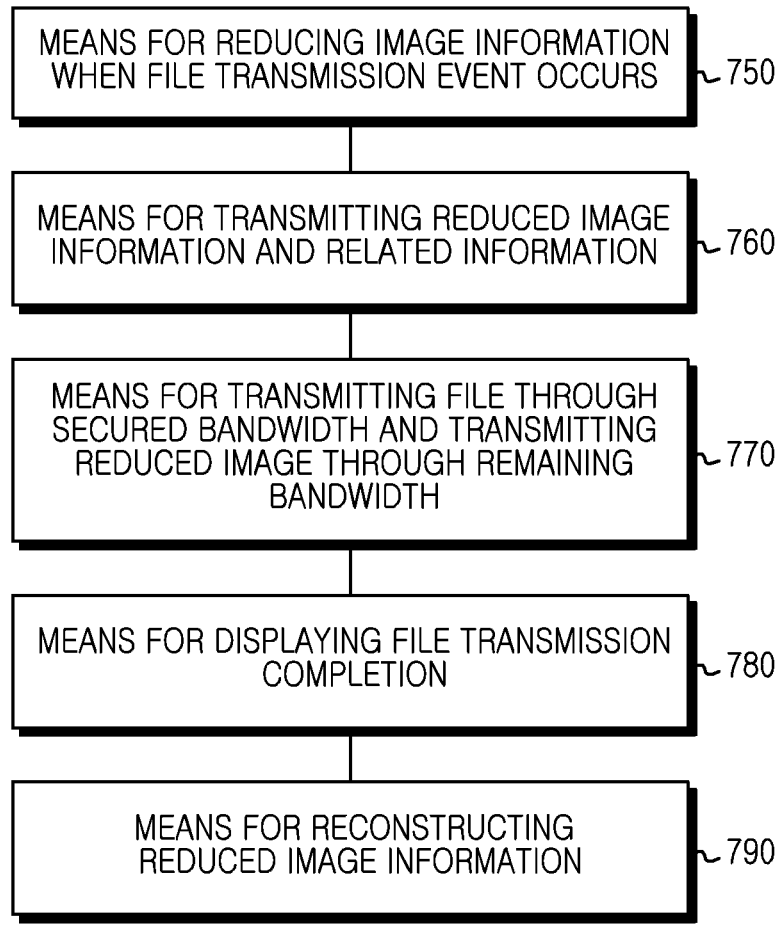
FIG. 7b is a view illustrating a device for transmitting a file during a video call according to another embodiment of the present invention.

FIG. 7b is a view illustrating a device for transmitting a file during a video call according to another embodiment of the present invention.

First, the device includes a means 750 for, when a file transmission event occurs during a video call, reducing video call data (including image data and voice data) in consideration of the size of a file to be transmitted, a means 760 for transmitting information on the reduced video call data and related information to a counterpart device, and a means 770 for transmitting a file through a bandwidth secured by reducing the video call data while transmitting the reduced video call data through the other bandwidth. The means 750 reduces the size of image data by changing parameters, such as the image size, image compression rate, and image frame speed.

Also, the device further includes a means 780 for, when the file transmission has been completed, displaying the completion of the file transmission to all parties of the video call and a means 790 for, after the file transmission is completed, reconstructing the reduced video call data. That is, the means 790 performs the video call with the original image size, image compression rate, and image frame speed before the reduction.

Figure 8A:
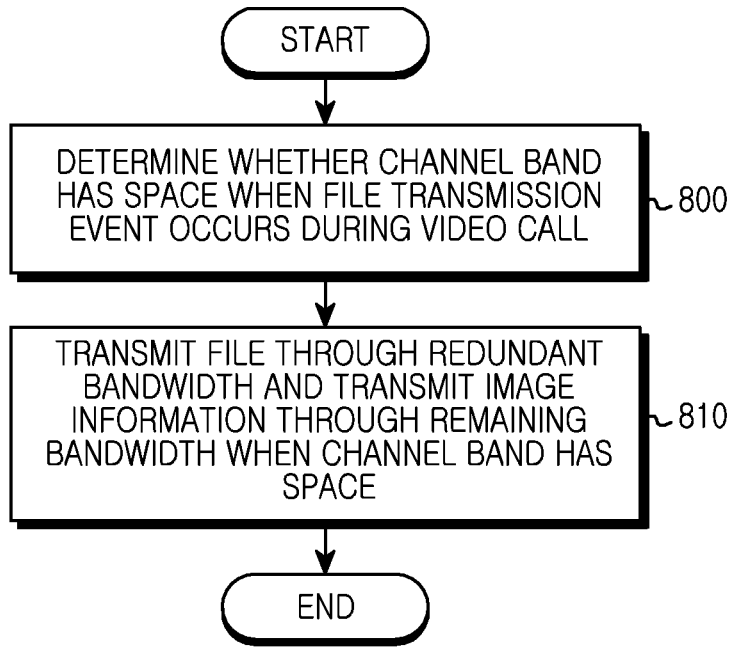
FIG. 8a is a flowchart illustrating a process of transmitting a file during a video call according to another embodiment of the present invention.

FIG. 8a is a flowchart illustrating a process of transmitting a file during a video call according to another embodiment of the present invention.

First, when a file transmission event occurs during a video call, an electronic device determines whether there is a redundant band for the file transmission (step 800).

Next, when a redundant band for the file transmission exists, the electronic device transmits a file through the redundant bandwidth and transmits video call data through the other bandwidth (step 810). That is, when the bandwidth for the video call has space, the electronic device transmits the file through the redundant bandwidth simultaneously while transmitting the video call data.

Figure 8B:
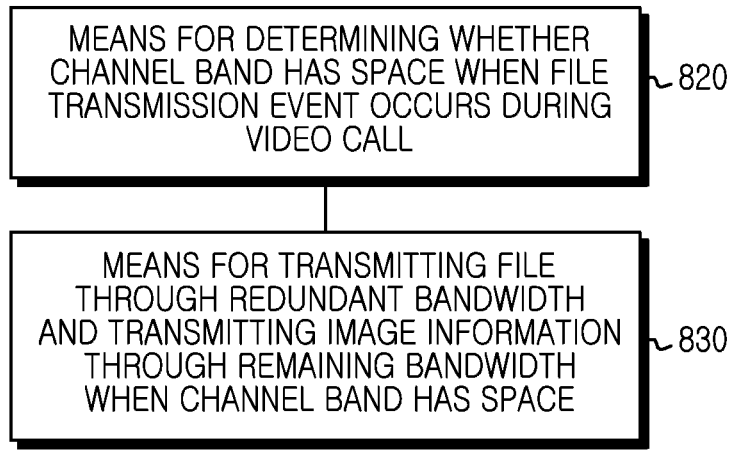
FIG. 8b is a view illustrating a device for transmitting a file during a video call according to another embodiment of the present invention.

FIG. 8b is a view illustrating a device for transmitting a file during a video call according to another embodiment of the present invention.

First, the device includes a means 820 for, when a file transmission event occurs during a video call, determining whether there is a redundant band for the file transmission, and a means 830 for, when a redundant band for the file transmission exists, transmitting a file through the redundant bandwidth and transmits video call data through the other bandwidth. That is, when the bandwidth for the video call has space, the transmission means 830 transmits the file through the redundant bandwidth simultaneously while transmitting the video call data.

Figure 9:
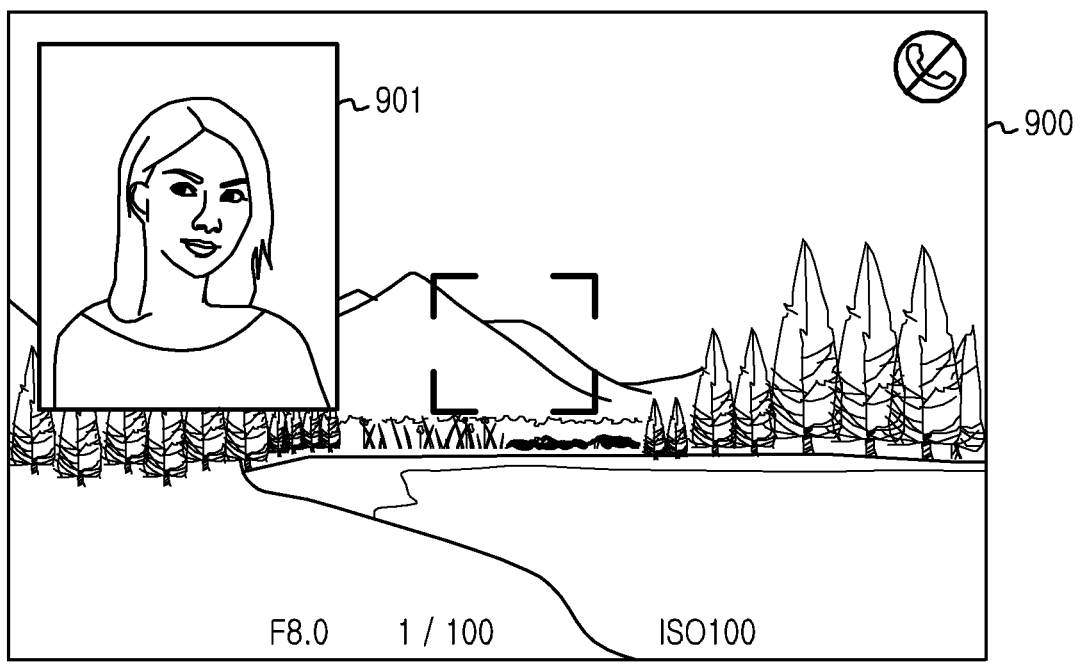
FIG. 9 illustrates a video call screen in a camera according to an embodiment of the present invention.

FIG. 9 illustrates a video call screen in a camera according to an embodiment of the present invention.

Referring to FIG. 9, an image displayed on a screen of a camera during a video call is illustrated. For example, an image (e.g. a scenery previewed through a lens) 900 of a camera itself is output on the entire screen of the camera, and an image 901 of a counterpart is output on a left upper portion of the screen. According to the implementation, the screen may be divided by the same ratio or different ratios to output its own image and a counterpart's image.

Otherwise, the counterpart's image may be output on the entire screen of the camera while its own image is displayed on a part of the screen.

Otherwise, only the counterpart's image or only its own image may be output on the entire screen of the camera.

however, the present invention is not limited to the example in which only the counterpart's image or only its own image is output.

Figure 10:
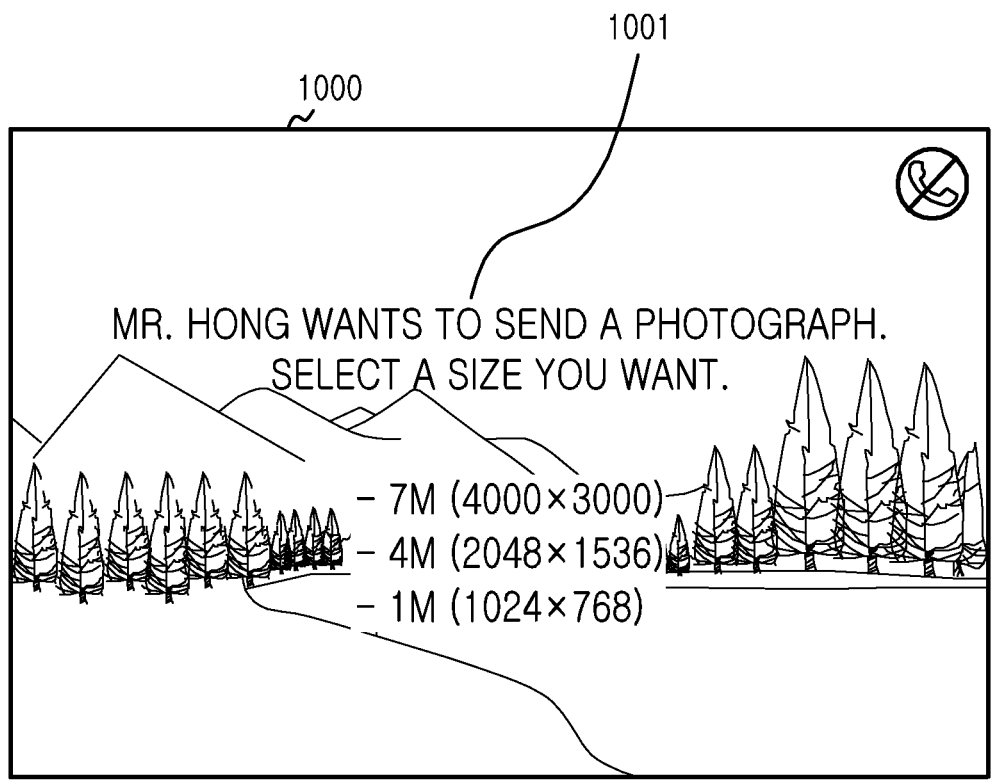
FIG. 10 illustrates a screen for selection of a file format according to an embodiment of the present invention.

FIG. 10 illustrates a screen for selection of a file format according to an embodiment of the present invention.

Referring to FIG. 10, a screen in which an electronic device to receive a file can select an image size by a file format is illustrated. For example, image sizes 1001 to be selected, including 7M (4000×3000), 4M (2048×1536), and 1M (1024×768), are displayed on the counterpart's image 1000 in the electronic device to receive the file. That is, the electronic device can select a desired file format according to the screen size and use of the file.

According to the implementation, image sizes to be selected, including 7M (4000×3000), 4M (2048×1536), and 1M (1024×768), are displayed on its own image in the electronic device to receive the file.

Figure 11:
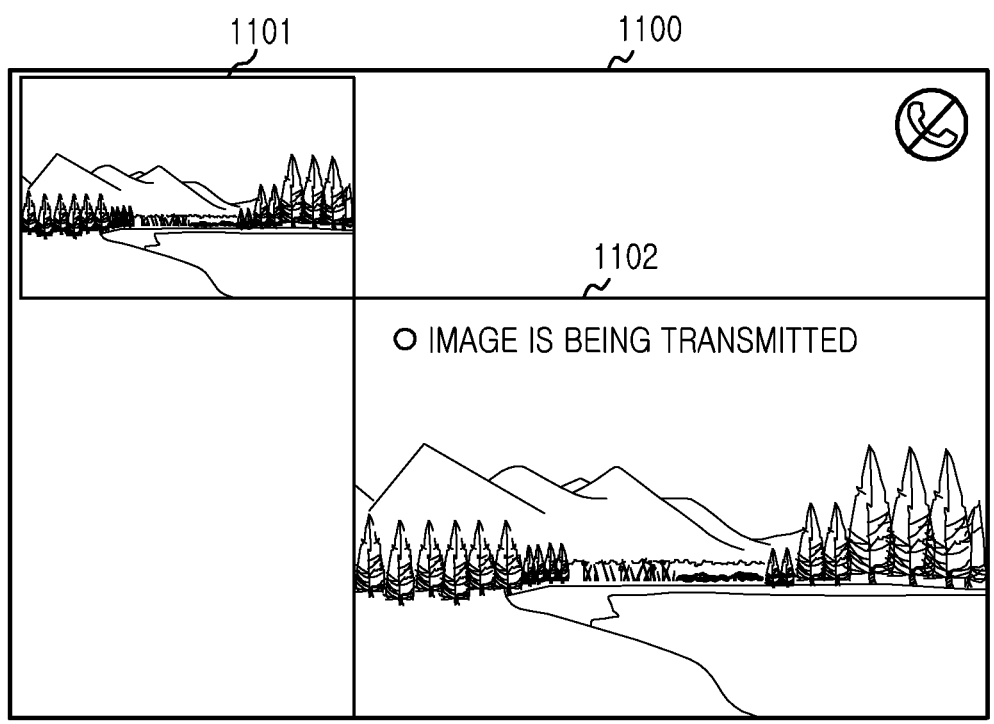
FIG. 11 illustrates a screen showing a file and a reduced image received from a counterpart during a video call according to an embodiment of the present invention.

FIG. 11 illustrates a screen showing a file and a reduced image received from a counterpart during a video call according to an embodiment of the present invention.

Referring to FIG. 11, when receiving a file during a video call, the electronic device receives reduced video call data and displays the reduced video call data on a left upper portion 1101 of a screen 1100 simultaneously while, in the case of receiving an image file, displaying the received image file on a right lower portion of the screen.

In the present invention, the locations for displaying the counterpart image 1101 and an image file 1102 are not limited, and the images may be displayed in various ways.

Although the embodiment has been described in the detailed description of the present disclosure, the present disclosure may be modified in various forms without departing from the scope of the present disclosure. Therefore, the scope of the present invention should not be defined as being limited to the embodiments, but should be defined by the appended claims and equivalents thereof.

What is claimed is:

1. A method in an electronic device, the method comprising:
    identifying a first bandwidth for file transmission when a file transmission event is generated during a video call with a counterpart electronic device;
    reducing video call data based on the identified first bandwidth;
    negotiating information with the counterpart electronic device wherein the information is associated with a file format of a file data to be transmitted to the counterpart electronic device;
    changing the file data based on the negotiated information; and
    transmitting the reduced video call data and the changed file data to the counterpart electronic device through a second bandwidth for the video call,
    wherein the first bandwidth is a partial area or an entire area of the second bandwidth.

2. The method of claim 1, wherein the reducing of the video call data comprises:
    determining at least one among an image size, an image compression rate, and a frame speed in consideration of a first bandwidth for the file transmission; and
    generating the video call data according to the determined image size, the image compression rate, and the frame speed.

3. The method of claim 1, further comprising:
    when the file transmission is completed, ceasing transmission of the reduced video call data and reconstructing the video call data.

4. The method of claim 1, wherein when the file transmission is completed, a file transmission completion notification is displayed to all parties of the video call.

5. The method of claim 1, wherein the reduced video call data includes both reduced image data and voice data, or the reduced video call data includes only voice data.

6. The method of claim 1, wherein a first bandwidth for the file transmission is determined on the basis of a channel state of the video call or a transmission rate of the video call data.

7. The method of claim 1, further comprising:
    delaying the file transmission and performing the file transmission when there is a space in the second bandwidth for the video call.

8. A method in an electronic device, the method comprising:
    receiving information associated with a file format of a file data to be received from a counterpart electronic device when a file reception event is generated during a video call with the counterpart electronic device;
    transmitting information associated with a desired file format to the counterpart electronic device in response to the received information from the counterpart electronic device;
    receiving reduced video call data and a file data through bandwidth for a video call from the counterpart electronic device, wherein the received file data is a file data changed by counterpart electronic device based on the transmitted information to the counterpart electronic device; and
    decoding and displaying, on a screen, reduced video call data, simultaneously while processing and displaying, on the screen, the corresponding file data.

9. The method of claim 8, wherein the reduced video call data is reduced according to least one among an image size, an image compression rate, and a frame speed, and the reduced video call data includes both reduced image data and voice data or includes only voice data.

10. The method of claim 8, further comprising:
    when reception of the file data is completed, ceasing reception of the reduced video call data and receiving reconstructed video call data.

11. The method of claim 8, wherein when the reception of the file data is completed, a file transmission completion notification is displayed to all parties of the video call.

12. An electronic device comprising:
    at least one processor;
    a memory; and
    at least one program which is stored in the memory and is configured, when the at least one program is executed by the at least one processor, to
    identify a first bandwidth for file transmission when a file transmission event is generated during a video call with a counterpart electronic device, reduce video call data based on the first bandwidth, negotiate information with the counterpart electronic device wherein the information is associated with a file format of a file data to be transmitted to the counterpart electronic device, change the file data based on the negotiated information, and transmit the reduced video call data and changed file data to the counterpart electronic device through a second bandwidth for the video call,
    wherein the first bandwidth is a partial area or an entire area of the second bandwidth.

13. An electronic device comprising:
   at least one processor;
   a memory; and
   at least one program which is stored in the memory and is configured, when the at least one program is executed by the at least one processor, to
   receive information associated with a file format of a file data to be received from a counterpart electronic device when a file reception event is generated during a video call with the counterpart electronic device, transmit information associated with a desired file format to the counterpart electronic device in response to the received information from the counterpart electronic device, receive reduced video call data and a file data through bandwidth for a video call from the counterpart electronic device and decode and display, on a screen, the reduced video call data, simultaneously while processing and displaying, on the screen, the corresponding file data,
   wherein the received file data is a file data changed by counterpart electronic device based on the transmitted information to the counterpart electronic device.

14. The electronic device of claim 12, wherein the reduction of the video call data comprises:
   determining at least one among an image size, an image compression rate, and a frame speed in consideration of a first bandwidth for the file transmission; and
   generating the video call data according to the determined image size, the image compression rate, and the frame speed.

15. The electronic device of claim 12, when the file transmission is completed, ceasing transmission of the reduced video call data and reconstructing the video call data.

16. The electronic device of claim 12, when the file transmission is completed, a file transmission completion notification is displayed to all parties of the video call.

17. The electronic device of claim 13, when the reception of the file data is completed, ceasing reception of the reduced video call data and receiving reconstructed video call data.

18. The electronic device of claim 12, when the reception of the file data is completed, a file transmission completion notification is displayed to all parties of the video call.

* * * * *